United States Patent
Fox et al.

(10) Patent No.: US 11,423,493 B2
(45) Date of Patent: Aug. 23, 2022

(54) COMBINATORIAL SOLVER AND LOGIC SOLVER PLANNER

(71) Applicant: Schlumberger Technology Corporation, Sugar Land, TX (US)

(72) Inventors: Maria Fox, Cambridge (GB); Derek Long, Cambridge (GB); Fangkai Yang, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 2 days.

(21) Appl. No.: 16/466,290

(22) PCT Filed: Dec. 7, 2017

(86) PCT No.: PCT/US2017/065001
§ 371 (c)(1),
(2) Date: Jun. 3, 2019

(87) PCT Pub. No.: WO2018/106855
PCT Pub. Date: Jun. 14, 2018

(65) Prior Publication Data
US 2019/0333164 A1    Oct. 31, 2019

Related U.S. Application Data

(60) Provisional application No. 62/431,858, filed on Dec. 9, 2016.

(51) Int. Cl.
*G06Q 50/02*    (2012.01)
*G06N 5/00*    (2006.01)
(Continued)

(52) U.S. Cl.
CPC ............. *G06Q 50/02* (2013.01); *G06N 5/003* (2013.01); *G06Q 10/0637* (2013.01); *G16Y 10/20* (2020.01)

(58) Field of Classification Search
CPC ..................................................... G06Q 50/02
See application file for complete search history.

(56) References Cited

U.S. PATENT DOCUMENTS

| | | | |
|---|---|---|---|
| 2007/0052705 A1* | 3/2007 | Oliveira | G06F 30/18 345/423 |
| 2007/0199721 A1* | 8/2007 | Givens | G06Q 10/06312 166/382 |

(Continued)

FOREIGN PATENT DOCUMENTS

WO    2016/112061 A1    7/2016

OTHER PUBLICATIONS

International Search Report and Written Opinion for the equivalent International patent application PCT/US2017/065001 dated Feb. 28, 2018.

(Continued)

*Primary Examiner* — Kurtis Gills
(74) *Attorney, Agent, or Firm* — Alec J. McGinn

(57) ABSTRACT

A method includes receiving oilfield operational plan information; determining oilfield operational plan actions based at least in part on the oilfield operational plan information by implementing a combinatorial solver; assessing at least a portion of the oilfield operational plan actions by implementing a logical solver; and, based at least in part on the determining and the assessing, outputting an oilfield operational plan as a digital plan that specifies at least one control action for oilfield equipment.

18 Claims, 10 Drawing Sheets

(51) Int. Cl.
    *G06Q 10/06*     (2012.01)
    *G16Y 10/20*     (2020.01)

(56) References Cited

U.S. PATENT DOCUMENTS

| | | | |
|---|---|---|---|
| 2011/0060711 A1* | 3/2011 | Macready | B82Y 10/00 |
| | | | 706/46 |
| 2012/0024605 A1* | 2/2012 | Elinas | G06Q 10/06 |
| | | | 175/57 |
| 2013/0317798 A1* | 11/2013 | Cheng | E21B 43/30 |
| | | | 703/10 |
| 2016/0350072 A1* | 12/2016 | Fox | G06F 7/468 |
| 2017/0177761 A1* | 6/2017 | Early | E21B 47/00 |
| 2017/0249359 A1* | 8/2017 | Abdelwahab | G06F 16/24542 |
| 2018/0012310 A1* | 1/2018 | Fox | G06Q 50/02 |
| 2018/0188747 A1* | 7/2018 | Venturelli | G06Q 10/08 |

OTHER PUBLICATIONS

International Preliminary Report on Patentability for the equivalent International patent application PCT/US2017/065001 dated Jun. 20, 2019.

* cited by examiner

COMBINATORIAL SOLVER AND LOGIC SOLVER PLANNER

RELATED APPLICATIONS

This application claims the benefit of and priority to a U.S. Provisional Application having Ser. No. 62/431,858, filed 9 Dec. 2016, which is incorporated by reference herein.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning can occur over one or more phases, which can include an exploration phase that aims to identify and assess an environment (e.g., a prospect, a play, etc.), which may include drilling of one or more bores (e.g., one or more exploratory wells, etc.). Other phases can include appraisal, development and production phases.

SUMMARY

A method can include receiving oilfield operational plan information; determining oilfield operational plan actions based at least in part on the oilfield operational plan information by implementing a combinatorial solver; assessing at least a portion of the oilfield operational plan actions by implementing a logical solver; and, based at least in part on the determining and the assessing, outputting an oilfield operational plan as a digital plan that specifies at least one control action for oilfield equipment. A system can include a processor; memory accessible by the processor; processor-executable instructions stored in the memory and executable to instruct the system to: receive oilfield operational plan information; determine oilfield operational plan actions based at least in part on the oilfield operational plan information by implementing a combinatorial solver; assess at least a portion of the oilfield operational plan actions by implementing a logical solver; and, based at least in part on determined oilfield operational plan actions and assessed oilfield operational plan actions, output an oilfield operational plan as a digital plan that specifies at least one control action for oilfield equipment. One or more computer-readable storage media can include processor-executable instructions to instruct a computing system to: receive oilfield operational plan information; determine oilfield operational plan actions based at least in part on the oilfield operational plan information by implementing a combinatorial solver; assess at least a portion of the oilfield operational plan actions by implementing a logical solver; and, based at least in part on determined oilfield operational plan actions and assessed oilfield operational plan actions, output an oilfield operational plan as a digital plan that specifies at least one control action for oilfield equipment. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
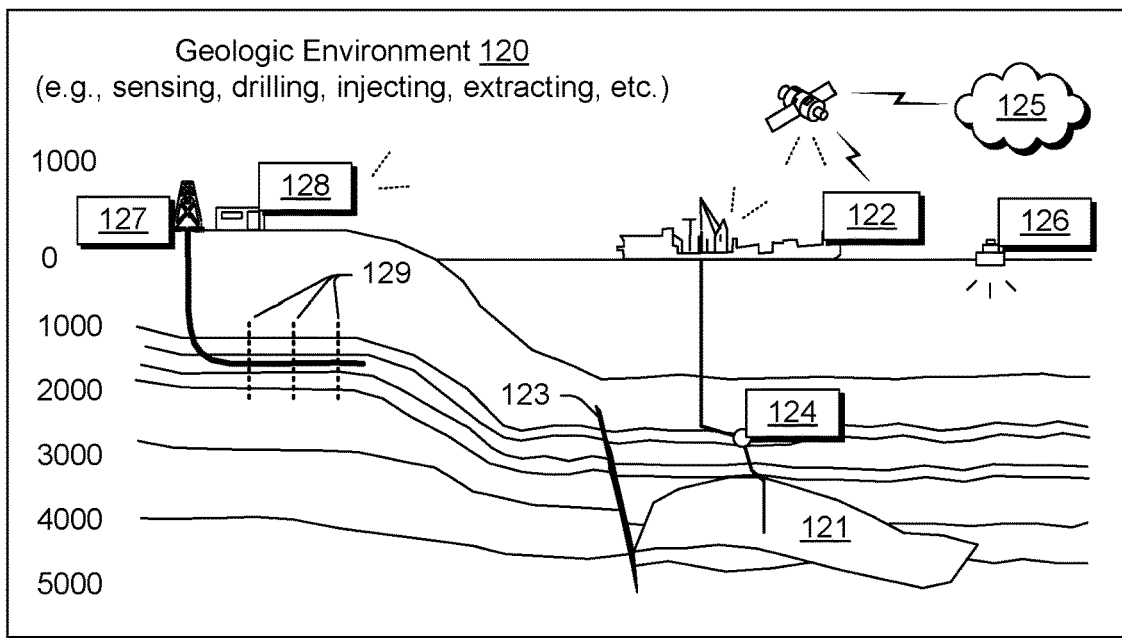
FIG. 1 illustrates examples of equipment in a geologic environment.
Figure 1:
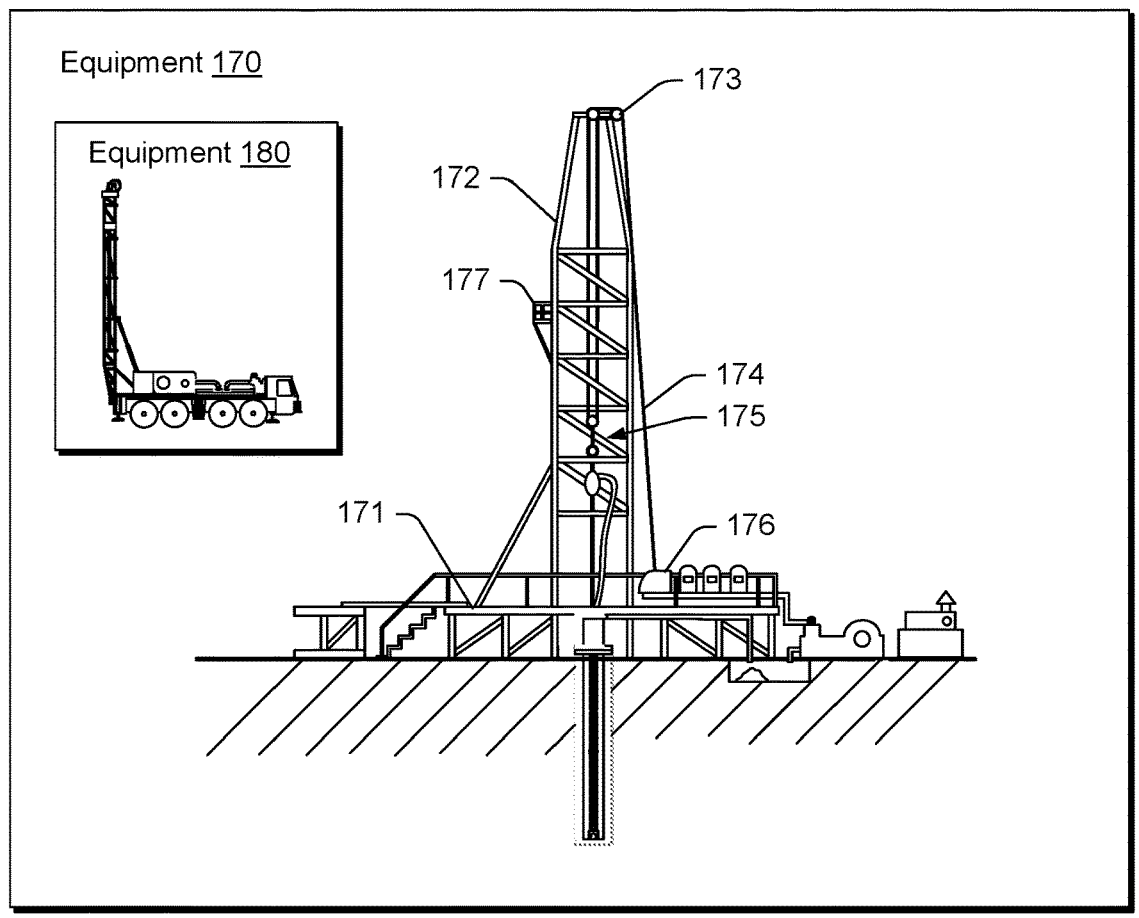

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced.

Figure 2:
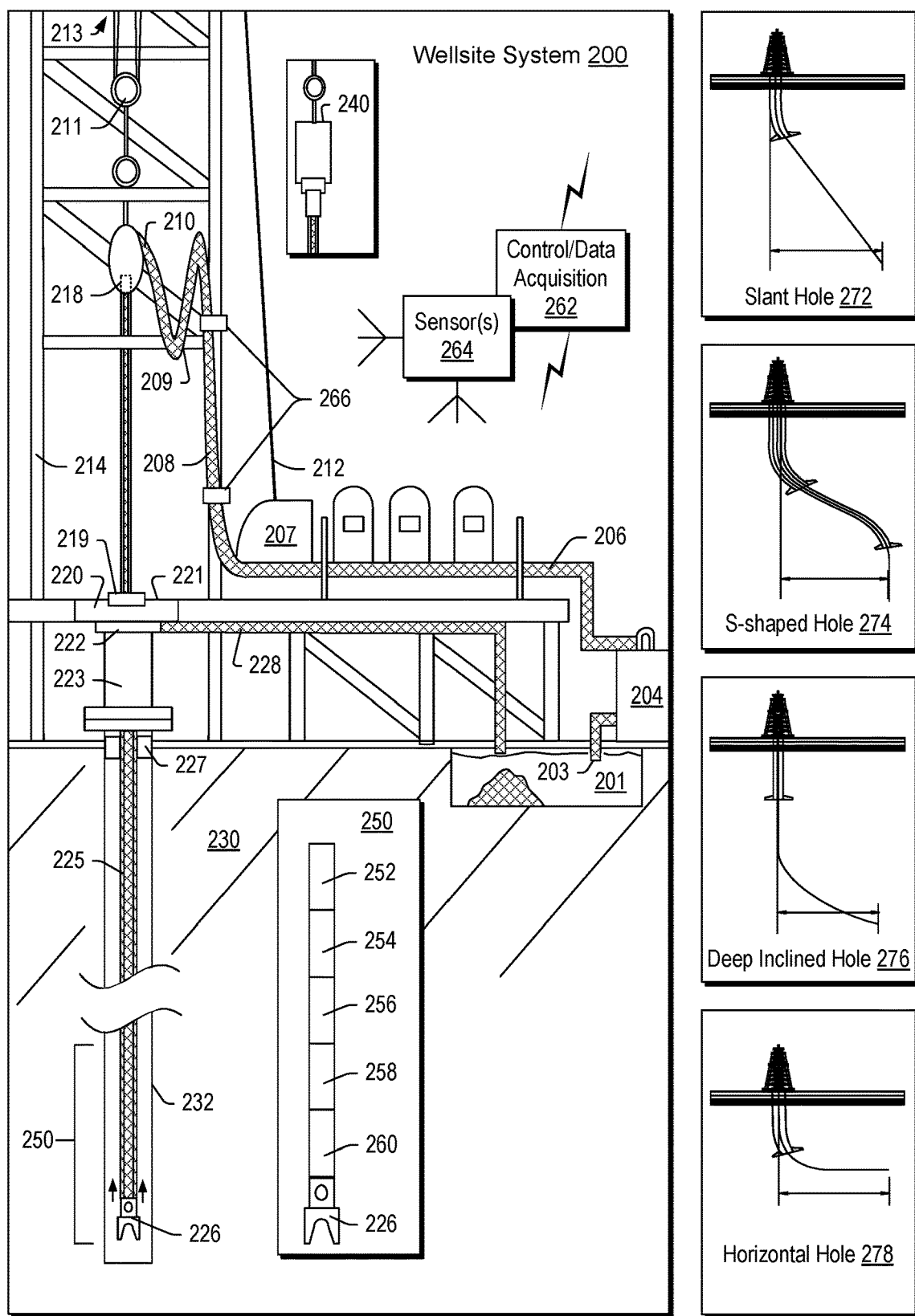
FIG. 2 illustrates examples of equipment and examples of hole types.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226. Such components or modules may be referred to as tools where a drillstring can include a plurality of tools.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform a method such as geosteering. As an example, a steerable system can include a PDM or a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore.

Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
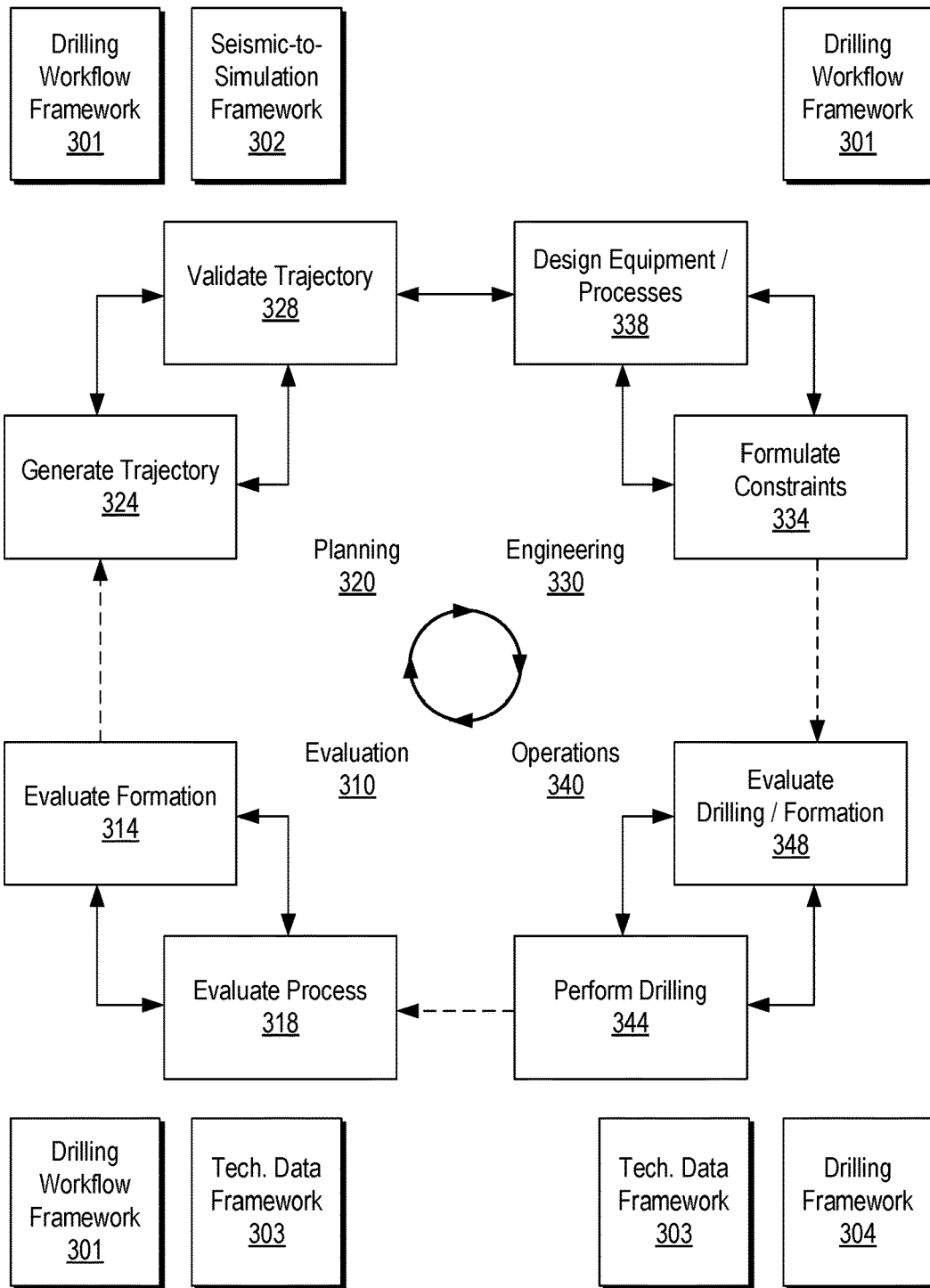
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Tex.) and the technical data framework 303 can be, for example, the TECHLOG® framework (Schlumberger Limited, Houston, Tex.).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™.NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Tex.), which allows for integration of add-ons (or plug-ins) into a PETREL® framework workflow. The OCEAN® framework environment leverages .NET™ tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Tex.) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Tex.) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over Processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
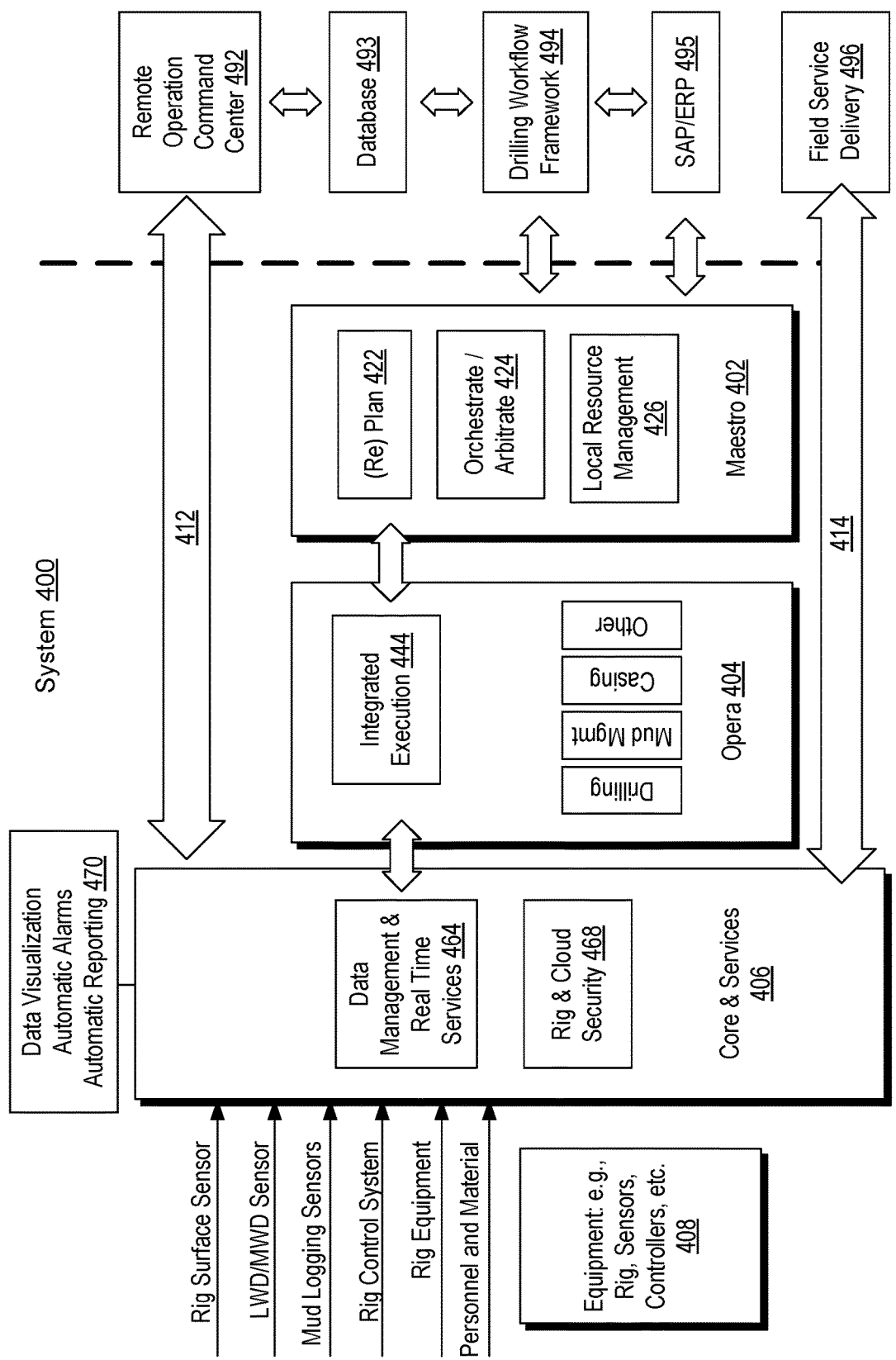
FIG. 4 illustrates an example of a system.

FIG. 4 shows an example of a system 400 that includes various components that can be local to a wellsite and includes various components that can be remote from a wellsite. As shown, the system 400 includes a Maestro block 402, an Opera block 404, a Core & Services block 406 and an Equipment block 408. These blocks can be labeled in one or more manners other than as shown in the example of FIG. 4. In the example of FIG. 4, the blocks 402, 404, 406 and 408 can be defined by one or more of operational features, functions, relationships in an architecture, etc.

As an example, the blocks 402, 404, 406 and 408 may be described in a pyramidal architecture where, from peak to base, a pyramid includes the Maestro block 402, the Opera block 404, the Core & Services block 406 and the Equipment block 408.

As an example, the Maestro block 402 can be associated with a well management level (e.g., well planning and/or orchestration) and can be associated with a rig management level (e.g., rig dynamic planning and/or orchestration). As an example, the Opera block 404 can be associated with a process management level (e.g., rig integrated execution). As an example, the Core & Services block 406 can be associated with a data management level (e.g., sensor, instrumentation, inventory, etc.). As an example, the Equipment block 408 can be associated with a wellsite equipment level (e.g., wellsite subsystems, etc.).

As an example, the Maestro block 402 may receive information from a drilling workflow framework and/or one or more other sources, which may be remote from a wellsite.

In the example of FIG. 4, the Maestro block 402 includes a plan/replan block 422, an orchestrate/arbitrate block 424 and a local resource management block 426. In the example of FIG. 4, the Opera block 404 includes an integrated execution block 444, which can include or be operatively coupled to blocks for various subsystems of a wellsite such as a drilling subsystem, a mud management subsystem (e.g., a hydraulics subsystem), a casing subsystem (e.g., casings and/or completions subsystem), and, for example, one or more other subsystems. In the example of FIG. 4, the Core & Services block 406 includes a data management and real-time services block 464 (e.g., real-time or near real-time services) and a rig and cloud security block 468 (e.g., as to provisioning and various type of security measures, etc.). In the example of FIG. 4, the Equipment block 408 is shown as being capable of providing various types of information to the Core & Services block 406. For example, consider information from a rig surface sensor, a LWD/MWD sensor, a mud logging sensor, a rig control system, rig equipment, personnel, material, etc. In the example, of FIG. 4, a block 470 can provide for one or more of data visualization, automatic alarms, automatic reporting, etc. As an example, the block 470 may be operatively coupled to the Core & Services block 406 and/or one or more other blocks.

As mentioned, a portion of the system 400 can be remote from a wellsite. For example, to one side of a dashed line appear a remote operation command center block 492, a database block 493, a drilling workflow framework block 494, a SAP/ERP block 495 and a field services delivery block 496. Various blocks that may be remote can be operatively coupled to one or more blocks that may be local to a wellsite system. For example, a communication link 412 is illustrated in the example of FIG. 4 that can operatively couple the blocks 406 and 492 (e.g., as to monitoring, remote control, etc.), while another communication link 414 is illustrated in the example of FIG. 4 that can operatively couple the blocks 406 and 496 (e.g., as to equipment delivery, equipment services, etc.). Various other examples of possible communication links are also illustrated in the example of FIG. 4.

As an example, the system 400 of FIG. 4 may be a field management tool. As an example, the system 400 of FIG. 4 may include a drilling framework (see, e.g., the drilling framework 304). As an example, blocks in the system 400 of FIG. 4 that may be remote from a wellsite.

As an example, a wellbore can be drilled according to a drilling plan that is established prior to drilling. Such a drilling plan, which may be a well plan or a portion thereof, can set forth equipment, pressures, trajectories and/or other parameters that define drilling process for a wellsite. As an example, a drilling operation may then be performed according to the drilling plan (e.g., well plan). As an example, as information is gathered, a drilling operation may deviate from a drilling plan. Additionally, as drilling or other operations are performed, subsurface conditions may change. Specifically, as new information is collected, sensors may transmit data to one or more surface units. As an example, a surface unit may automatically use such data to update a drilling plan (e.g., locally and/or remotely).

As an example, the drilling workflow framework 494 can be or include a G&G system and a well planning system. As an example, a G&G system corresponds to hardware, software, firmware, or a combination thereof that provides support for geology and geophysics. In other words, a geologist who understands the reservoir may decide where to drill the well using the G&G system that creates a three-dimensional model of the subsurface formation and includes simulation tools. The G&G system may transfer a well trajectory and other information selected by the geologist to a well planning system. The well planning system corresponds to hardware, software, firmware, or a combination thereof that produces a well plan. In other words, the well plan may be a high-level drilling program for the well. The well planning system may also be referred to as a well plan generator.

In the example of FIG. 4, various blocks can be components that may correspond to one or more software modules, hardware infrastructure, firmware, equipment, or any combination thereof. Communication between the components may be local or remote, direct or indirect, via application programming interfaces, and procedure calls, or through one or more communication channels.

As an example, various blocks in the system 400 of FIG. 4 can correspond to levels of granularity in controlling operations of associated with equipment and/or personnel in an oilfield. As shown in FIG. 4, the system 400 can include the Maestro block 402 (e.g., for well plan execution), the Opera block 404 (e.g., process manager collection), the Core & Services block 406, and the Equipment block 408.

The Maestro block 402 may be referred to as a well plan execution system. For example, a well plan execution system corresponds to hardware, software, firmware or a combination thereof that performs an overall coordination of the well construction process, such as coordination of a drilling rig and the management of the rig and the rig equipment. A well plan execution system may be configured to obtain the general well plan from well planning system and transform the general well plan into a detailed well plan. The detailed well plan may include a specification of the activities involved in performing an action in the general well plan, the days and/or times to perform the activities, the individual resources performing the activities, and other information.

As an example, a well plan execution system may further include functionality to monitor an execution of a well plan to track progress and dynamically adjust the plan. Further, a well plan execution system may be configured to handle logistics and resources with respect to on and off the rig. As an example, a well plan execution system may include multiple sub-components, such as a detailer that is configured to detail the well planning system plan, a monitor that is configured to monitor the execution of the plan, a plan manager that is configured to perform dynamic plan management, and a logistics and resources manager to control the logistics and resources of the well. In one or more embodiments, a well plan execution system may be configured to coordinate between the different processes managed by a process manager collection (see, e.g., the Opera block 404). In other words, a well plan execution system can communicate and manage resource sharing between processes in a process manager collection while operating at, for example, a higher level of granularity than process manager collection.

As to the Opera block 404, as mentioned, it may be referred to as a process manager collection. In one or more embodiments, a process manager collection can include functionality to perform individual process management of individual domains of an oilfield, such as a rig. For example, when drilling a well, different activities may be performed. Each activity may be controlled by an individual process manager in the process manager collection. A process manager collection may include multiple process managers, whereby each process manager controls a different activity (e.g., activity related to the rig). In other words, each process manager may have a set of tasks defined for the process manager that is particular to the type of physics involved in the activity. For example, drilling a well may use drilling mud, which is fluid pumped into well in order to extract drill cuttings from the well. A drilling mud process manager may exist in a process manager collection that manages the mixing of the drilling mud, the composition, testing of the drilling mud properties, determining whether the pressure is accurate, and performing other such tasks. The drilling mud process manager may be separate from a process manager that controls movement of drill pipe from a well. Thus, a process manager collection may partition activities into several different domains and manages each of the domains individually. Amongst other possible process managers, a process manager collection may include, for example, a drilling process manager, a mud preparation and management process manager, a casing running process manager, a cementing process manager, a rig equipment process manager, and other process managers. Further, a process manager collection may provide direct control or advice regarding the components above. As an example, coordination between process managers in a process manager collection may be performed by a well plan execution system.

As to the Core & Service block 406 (e.g., a core services block or CS block), it can include functionality to manage individual pieces of equipment and/or equipment subsystems. As an example, a CS block can include functionality to handle basic data structure of the oilfield, such as the rig, acquire metric data, produce reports, and manages resources of people and supplies. As an example, a CS block may include a data acquirer and aggregator, a rig state identifier, a real-time (RT) drill services (e.g., near real-time), a reporter, a cloud, and an inventory manager.

As an example, a data acquirer and aggregator can include functionality to interface with individual equipment components and sensor and acquire data. As an example, a data acquirer and aggregator may further include functionality to interface with sensors located at the oilfield.

As an example, a rig state identifier can includes functionality to obtain data from the data acquirer and aggregator and transform the data into state information. As an example, state information may include health and operability of a rig as well as information about a particular task being performed by equipment.

As an example, RT drill services can include functionality to transmit and present information to individuals. In particular, the RT drill services can include functionality to transmit information to individuals involved according to roles and, for example, device types of each individual (e.g., mobile, desktop, etc.). In one or more embodiments, information presented by RT drill services can be context specific, and may include a dynamic display of information so that a human user may view details about items of interest.

As an example, in one or more embodiments, a reporter can include functionality to generate reports. For example, reporting may be based on requests and/or automatic generation and may provide information about state of equipment and/or people.

As an example, a wellsite "cloud" framework can correspond to an information technology infrastructure locally at an oilfield, such as an individual rig in the oilfield. In such an example, the wellsite "cloud" framework may be an "Internet of Things" (IoT) framework. As an example, a wellsite "cloud" framework can be an edge of the cloud (e.g., a network of networks) or of a private network.

As an example, an inventory manager can be a block that includes functionality to manage materials, such as a list and amount of each resource on a rig.

In the example of FIG. 4, the Equipment block 408 can correspond to various controllers, control unit, control equipment, etc. that may be operatively coupled to and/or embedded into physical equipment at a wellsite such as, for example, rig equipment. For example, the Equipment block 408 may correspond to software and control systems for individual items on the rig. As an example, the Equipment block 408 may provide for monitoring sensors from multiple subsystems of a drilling rig and provide control commands to multiple subsystem of the drilling rig, such that sensor data from multiple subsystems may be used to provide control commands to the different subsystems of the drilling rig and/or other devices, etc. For example, a system may collect temporally and depth aligned surface data and downhole data from a drilling rig and transmit the collected data to data acquirers and aggregators in core services, which can store the collected data for access onsite at a drilling rig or offsite via a computing resource environment.

As mentioned, the system 400 of FIG. 4 can be associated with a plan where, for example, the plan/replan block 422 can provide for planning and/or re-planning one or more operations, etc.

Figure 5:
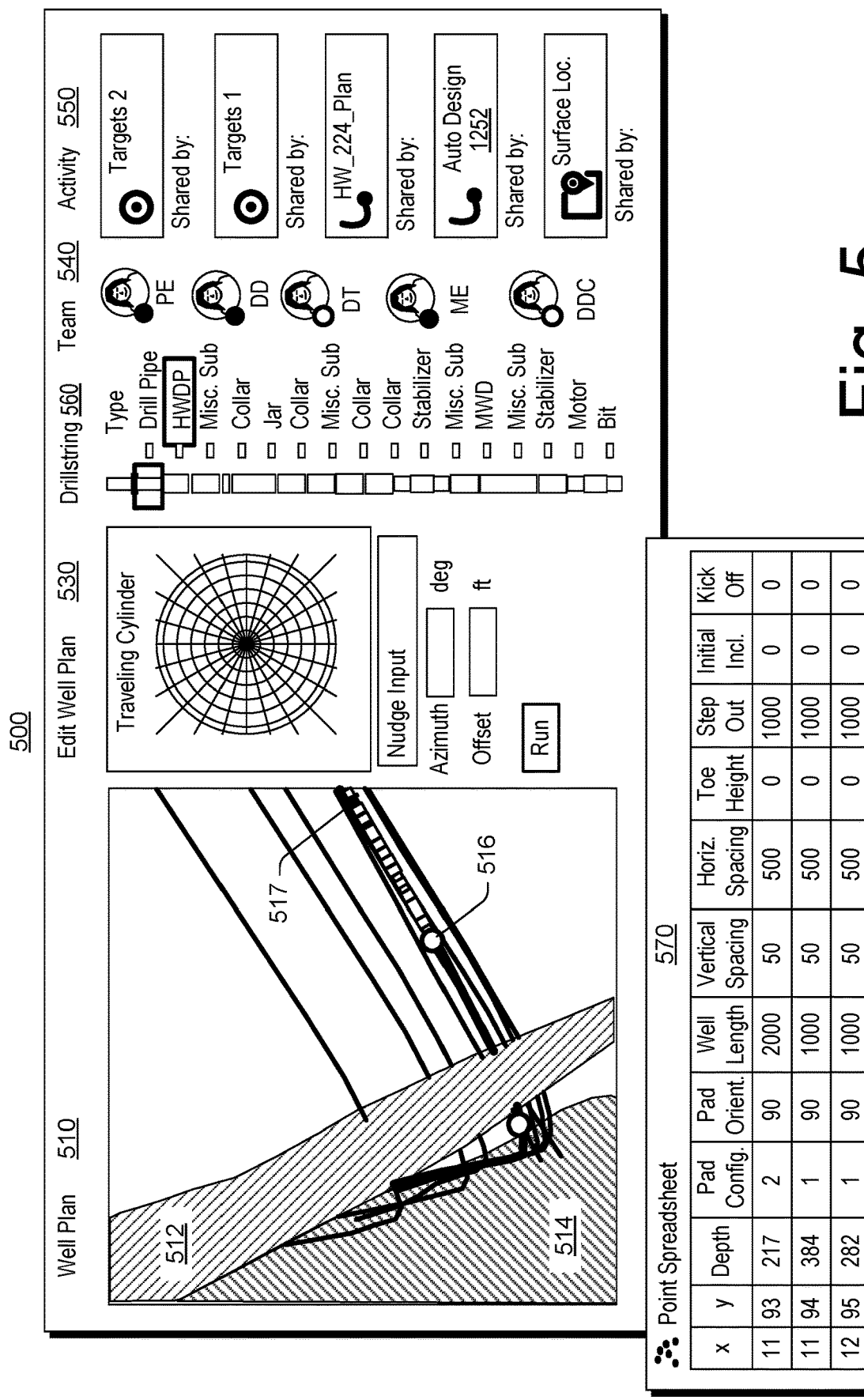
FIG. 5 illustrates an example of a graphical user interface.

FIG. 5 shows an example of a graphical user interface (GUI) 500 that includes information associated with a well plan. Specifically, the GUI 500 includes a panel 510 where surfaces representations 512 and 514 are rendered along with well trajectories where a location 516 can represent a position of a drillstring 517 along a well trajectory. The GUI 500 may include one or more editing features such as an edit well plan set of features 530. The GUI 500 may include information as to individuals of a team 540 that are involved, have been involved and/or are to be involved with one or more operations. The GUI 500 may include information as to one or more activities 550. As shown in the example of FIG. 5, the GUI 500 can include a graphical control of a drillstring 560 where, for example, various portions of the drillstring 560 may be selected to expose one or more associated parameters (e.g., type of equipment, equipment specifications, operational history, etc.). FIG. 5 also shows a table 570 as a point spreadsheet that specifies information for a plurality of wells.

Figure 6:
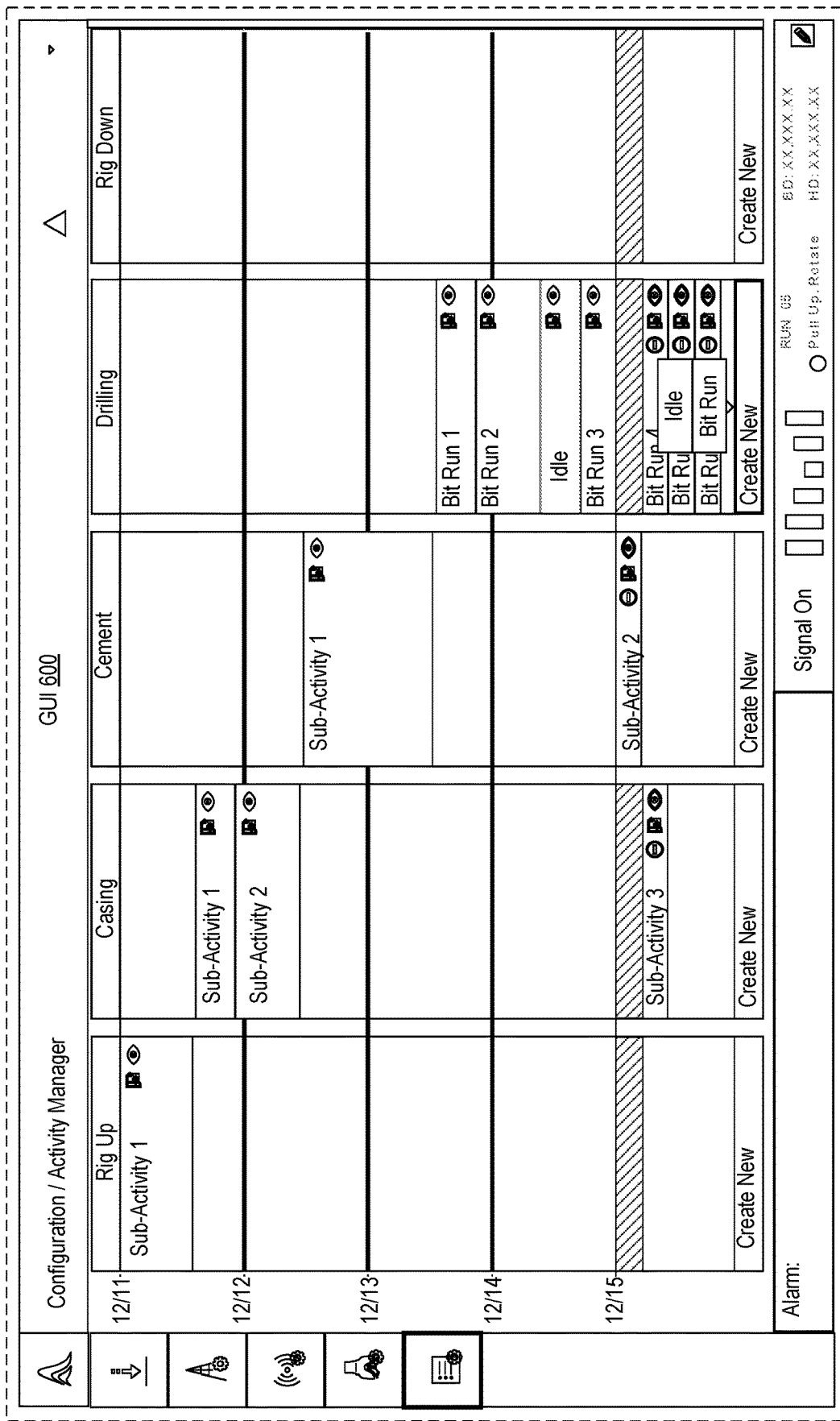
FIG. 6 illustrates an example of a graphical user interface.

FIG. 6 shows an example of a graphical user interface (GUI) 600 that includes a calendar with dates for various operations that can be part of a plan. For example, the GUI 600 shows rig up, casing, cement, drilling and rig down operations that can occur over various periods of time. Such a GUI may be editable via selection of one or more graphical controls.

As an example, a method can include implementing a Planning Domain Description Language (PDDL) with answer set solving, for example, as a solving technique for finding an answer set for a logic program. In such an example, the PDDL can be domain independent where constructs may be tailored for one or more particular planning problems. As an example, a system can be a planning system or a planner that implements a hybrid solver, in that one solver can be a combinatorial solver and that another solver can be a logic solver.

As an example, a planning algorithm can integrate a temporal planning algorithm (e.g., implemented via POPEX) with answer set solver as an advisor/solver. In such an example, the answer set solver can be queried by the planning algorithm during a search process, for example, to support indirect effects of actions (e.g., formulated as derived predicates), to resolve state constraints, etc. As an example, an answer set solver can enhance a planning algorithm such as, for example, a POPEX implemented algorithm. As an example, an integrated system can be utilized for planning operations in the oil and gas industry. Such operations can be or can include field operations.

As an example, a system can provide for two-way interaction between a planning system and answer set solver. In such an example, a system can be a PDDL solver/planner that takes a PDDL domain formulation and a problem definition as input and generates an output. In such an example, the output can be a plan that includes a sequence or sequences of actions. Such a plan may be in the form of digital information, which may be a digital information file and/or a stream of digital information. As an example, one or more actions of the plan may be followed by one or more individuals, one or more pieces of equipment, etc. As an example, by applying actions (e.g., one-by-one, in series, in parallel, according to their temporal relationships, etc.), a desired result or desired results may be achieved.

As an example, a system can include one or more PDDL solving algorithms. As an example, a PDDL solving algorithm can be a type of search algorithm that traverses through a state space of a dynamic planning domain. Such an algorithm may aim to generate the shortest planning, which may be PSPACE-complete in that it may tend to be computationally intractable. In such an example, heuristics may be used to guide the search. A system may aim to generate a feasible plan, in a relatively computationally efficient manner (e.g., whether as to computational resources, computational time or both resources and time).

POPEX is an example of an implementation of a PDDL solver that supports durative actions and interaction with external solvers. POPEX employs heuristics that can use "temporal relaxed planning graph (TRPG)" based techniques to evaluate heuristic values of states. In such an example, more "promising" states may be chosen to be explored first. Such an approach can be part of an overall search algorithm, which may be based on a framework of "enforced hill climbing" as a form of greedy search. In the POPEX implementation, an external solver interface can allow for specification of domain-dependent heuristics. As an example, such an external solver may be queried by a planner during one or more search processes.

As an example, a mechanism can allow for complex dynamics (e.g., consider dynamics set forth by one or more sets of differential equations), which may be specified outside of a PDDL domain and be treated by a specialized solver. As an example, a planner can orchestrate heterogeneous actions within a larger view of a planning scheme (e.g., planning universe). As an example, a system can implement an external solver to describe an alternating circuit system and a POPEX implementation can generate a plan that includes actions of operating transformers and busbars, for example, via querying an external solver during its search process(es) to determine effects of actions under different contexts.

A combinatorial solver can be a combinatorial search solver suitable for implementing one or more types of search algorithms for solving instances of one or more types of problems that may be classified as being "hard", in general, where an algorithm may aim to efficiently explore a large solution space of such instances. Various types of combinatorial search algorithms aim to achieve efficiency by reducing the effective size of the search space or employing heuristics. Some algorithms are guaranteed to find the optimal solution, while others may return a single solution as the best solution found in the part of the state space that was explored.

As an example, a method can include implementing Answer Set Programming (ASP), which is a form of declarative programming oriented towards difficult (primarily NP-hard) search problems. A solver that can solve ASP problems may be referred to as an ASP solver, as a type of logic solver and/or as a type of model-based solver.

NP-hardness (non-deterministic polynomial-time hard), in computational complexity theory, is a class of problems that are, informally, "at least as hard as the hardest problems in NP". More precisely, a problem H is NP-hard when each problem L in NP can be reduced in polynomial time to H, that is given a solution for L, it can be verified that it is a solution for H in polynomial time.

As an example, ASP can be utilized to represent a given computational problem by a logic program whose answer sets correspond to solutions, and then to use an ASP solver for finding answer sets of the program. Such an approach can be somewhat akin to that of propositional Satisfiability Testing (SAT as in a Boolean satisfiability problem), where problems are encoded as propositional theories whose models represent the solutions to a given problem. Even though, syntactically, ASP programs resemble Prolog programs, they are treated by rather different computational mechanisms. As an example, a method may implement model generation rather than query evaluation.

More formally, ASP is based on stable model (answer set) semantics of logic programming. In ASP, search problems may be reduced to computing stable models where answer set solvers (programs for generating stable models) can be used to perform a search. As an example, a computational process can be employed in the design of an answer set solvers such as an enhancement of the Davis-Putnam-Logemann-Loveland (DPLL) algorithm that can, in principle, terminate (e.g., as opposed to a Prolog query evaluation, which may lead to an infinite loop; noting that Prolog is a general-purpose logic programming language associated with artificial intelligence and computational linguistics.

The aforementioned DPLL algorithm is a complete, backtracking-based search algorithm for deciding the satisfiability of propositional logic formulae in conjunctive normal form (e.g., for solving a CNF-SAT problem).

As to CNF-SAT, CNF stands for conjunctive normal form and SAT stands for Satisfiability Testing as in a Boolean satisfiability problem. A propositional logic formula, also called Boolean expression, can be built from variables, operators AND (conjunction, also denoted by $\wedge$), OR (disjunction, $\vee$), NOT (negation, $\neg$), and parentheses. A formula is said to be satisfiable if it can be made TRUE by assigning appropriate logical values (e.g., TRUE, FALSE) to its variables. The Boolean satisfiability problem (SAT) is, given a formula, to check whether it is satisfiable (e.g., a type of decision problem).

Several special cases of the Boolean satisfiability problem exist in which the formulas have a particular structure. A literal is either a variable, then called positive literal, or the negation of a variable, then called negative literal. A clause is a disjunction of literals (or a single literal). A clause can be called a Horn clause if it includes at most one positive literal. A formula is in conjunctive normal form (CNF) if it is a conjunction of clauses (or a single clause).

As an example, a system can partition logic-based reasoning of an automated planner into parts. For example, consider an approach that partitions logic-based reasoning into at least the following two parts: a part natively determined by a planner (e.g., POPEX, etc.) and a part determined by an answer set programming (ASP) solver (e.g., clingo, etc.). Such an approach can be a special case of a general approach that includes interfacing a planner with an external solver that is expert at solving part of a problem (e.g., a planning problem). As an example, a system can implement an ASP solver and a planner that reason about logical structures, which can be the same types of logical structures, where the system can impose particular specifications in attaching the ASP solver to the planner, which may be performed in a domain independent manner.

As an example, a system can partition reasoning tasks in a manner that simplifies PDDL modeling, reduces planner searching, increases expressive power in logical relations that can be captured, and provides an ability to import aspects of ASP research into planning.

As an example, such a system can be part of a system such as the system 400 of FIG. 4. For example, consider the Maestro block 402 as including PDDL solver (e.g., POPEX) features and answer set solver (e.g., clingo) features and/or one or more interfaces that can access PDDL solver features and/or answer set solver features. As shown in FIG. 4, the system 400 includes various components that can provide for receipt of oilfield operational plan information and output of oilfield operational plan information, which may be, for example, specified in one or more oilfield operational plans. As an example, an oilfield operational plan can be a digital plan that can include one or more control actions. As an example, a control action can be directly and/or indirectly implemented at least in part via circuitry that is operatively coupled to one or more pieces of oilfield equipment.

As an example, a control action may be specified in a digital plan that is received by a computational framework that can render a graphical user interface (GUI) to a display such as, for example, the GUI 600 of FIG. 6. As shown, the GUI 600 of FIG. 6 can specify various control actions (e.g., Rig Up, Casing, Cement, Drilling, Rig Down, etc.). As an example, a control action may be specified with respect to a category of an oilfield operational action. As an example, a control action may be specified with respect to one or more other control actions in a logical manner (e.g., as a sequence, simultaneously, etc.). As an example, a control action may be specified with respect to a time (e.g., a date, a time of day, a time a resource is available, a time of reaching a depth along a trajectory, etc.). As shown in the example of FIG. 6, real-time information may be received and rendered to the GUI 600 (see, e.g., "Signal On", "Pull Up, Rotate", "Run 05", etc.). As an example, a computational framework that renders the GUI 600 can be operatively coupled to a clock such that one or more triggers occur that issue one or more signals associated with one or more control actions as specified by a digital plan for oilfield operations (e.g., an oilfield operational plan). As an example, an oilfield operational plan can include operational information for more than one rig. For example, a system may render a plurality of GUIs where each GUI corresponds to a different rig where the rigs may be in a common oilfield. As an example, a system may output an oilfield operational plan that includes control actions for a plurality of rigs in an oilfield.

As an example, a method can include a PDDL solver POPEX treating an answer set solver (e.g., clingo, etc.) as an external query engine for logical reasoning during plan generation. In such an example, the PDDL solver (e.g., POPEX) can generate plan actions during which an ASP solver (e.g. clingo) can be used to evaluate derived predicates (e.g., indirect effects of actions defined by ASP rules or PDDL axioms, by specifying static relationship between predicates) or state constraints. As an example, an ASP solver (e.g., clingo) can be accessed during plan generation.

ASP tools can include, for example, gringo, clasp, clingo, and iclingo, as developed at the University of Potsdam and/or modified elsewhere. The first tool, gringo, is a grounder capable of translating logic programs that include variables provided by users into equivalent propositional logic programs. The answer sets of such programs can be computed by clasp, which is a solver. The third tool, clingo, integrates the functionalities of gringo and clasp, thus, acting as a monolithic solver for user programs. Finally, iclingo extends clingo by an incremental mode that incorporates both grounding and solving. ASP approaches can utilize one or more of these tools.

In ASP, a method may provide a uniform problem definition where the method may separate encoding from an instance of a problem. For example, consider the following Towers of Hanoi problem: given an initial placement of discs, a goal situation, and a number n, decide whether there is a sequence of moves of length n that satisfies the conditions given above. Such a decision problem can be elegantly specified by reducing it to a declarative problem solving paradigm like ASP, where efficient off-the-shelf tools like gringo and clasp can be implemented to solve the problem. More specifically, consider a Towers of Hanoi instance specified via facts over predicates peg/1 and disk/1 that correspond to the pegs and disks in the puzzle. Discs are enumerated by consecutive integers beginning with one, where a disc with a lower number is considered to be bigger than a disc with a higher number. The pegs can have arbitrary names. Furthermore, the predicates init on/2 and goal on/2 describe the initial and goal situation, respectively. Their first argument is the number of a disc and the second argument is the peg on which the disc is located in the initial or goal situation. Finally, the predicate moves/1 specifies the number of moves within which the goal situation has to be reached. Note that the original puzzle had three pegs and a fixed initial and goal situation. With ASP, it is possible to change such aspects where encoding can be represented in with an arbitrary number of pegs and a desired initial and/or a desired goal situation.

As to the input language of gringo and clingo, the tool gringo is a grounder capable of translating logic programs provided by users into equivalent ground programs. The output of gringo can be piped into solver clasp, which then computes answer sets. System clingo internally couples gringo and clasp, thus, it takes care of both grounding and solving. In contrast to gringo outputting ground programs, clingo returns answer sets. As an example, one or more logic programs can be specified in one or more text files whose names can be passed via a command line (e.g., or other manner) in an invocation of either gringo or clingo. Various types of constructs belong to the input language of gringo and clingo.

As mentioned, a method can integrate solving techniques of a Planning Domain Description Language (PDDL) with answer set solving, the solving techniques being for finding an answer set or sets for a logic program. The result can lead to a PDDL solver POPEX treating an answer set solver (e.g., clingo) as an external query engine for logical reasoning during plan generation. Such an approach can provide more power and expressivity to model, for example, a well construction domain in a system. For example, consider the Maestro block 402 of FIG. 4 being associated with a domain or domains as to planning.

Such an approach can be implemented to integrate two powerful KR technologies for declarative domain representation and automated planning. Such an approach may provide a generic planning algorithm, for example, as may be applied to one or more domains that may include well planning and/or other types of planning.

As an example, a method can be implemented in planning for operations in the oil and gas industry. For example, well planning is an example of planning for operations in the oil and gas industry.

As discussed above, ASP is a declarative programming paradigm that aims to solve complex search problems. ASP can include useful language constructs to facilitate modeling, such as cardinality constraints, weight constraints, conditionals, etc., as well as maturity of efficient answer set solvers. As an example, an extension of ASP with constraint solving can allow modeling processes that have continuous change in continuous time. As an example, ASP programs can be automatically processed by one or more answer set solvers (e.g., clingo, clingcon, etc.) for answer set programs with constraints that generate truth assignments (answer sets) of a given program.

Assuming in the PDDL formulation there exists an action prepare_drilling_fluid

```
(:durative-action prepare_drilling_fluid
    :parameters (?r - run ?s - section ?m - mud)
    :duration (= ?duration (spudMudTime))
    :condition (and
        (at start (readytodrill ?r))
        (at start (requiremud ?m ?r))
        (at start (spudRun ?r))
        (at start (insection ?s ?r))
    )
    :effect (and
        (at end (mudonspot ?m ?r))
    )
)
```

This action can be first executed to prepare drilling fluid for the spudrun, resulting type of mud be on spot for the spud run. As a side effect of this action, once the mud is available for a section, then it is available for consecutive sections that use the same kind of mud, which can be naturally described by the following ASP rules:

```
mudonspot(M,R) :-mudonspot(M1,R1), samekindofmud(M,M1),
nextrun(R,R1), requiremud(M,R).
samekindofmud(M,M1) :- wbm(M), wbm(M1).
Samekindofmud(M,M1) :- obm(M), obm(M1).
```

Above, it is possible to assume there are two water based mud m and m1, and that there can be three consecutive runs in sequence that use water-based mud, and mud for r1 is on spot, then consider adding facts

```
wbm(m1).wbm(m2).wbm(m3).
requiremud(m1,r1).requiremud(m2,r2).requiremud(m3,r3).
```

-continued

```
nextrun(r1,r2). nextrun(r2,r3). mudonspot(m1,r1).
```

In such an example, the answer set solver clingo can be implemented to return an answer set that includes: mudonspot(m1,r1). mudonspot(m2,r2). mudonspot(m3,r3).

The inference capability demonstrated as above can be used to complement the planning capability of a current PDDL-based planner, in the sense that it will capture complicated side effect of an action.

The PDDL language specification has a construct that aims to model inference, called axioms. Most existing PDDL solvers cannot directly handle PDDL axioms. For those that can handle PDDL axioms, they tend to be more limited than the example rules given above. For instance, if in PDDL formulation there is an action that directly affects the predicate mudonspot, then according to the syntax of PDDL axioms, mudonspot cannot also be a derived predicate. Such a restriction can assist in managing complexity of handling derived predicates in planning.

As an example, alternatively or additionally, a method can include treating an answer set solver as an external solver that couples with a PDDL solver by directly processing ASP rules. Such an approach allows for more expressive inference rules, for example, without changing the semantics of PDDL. As an example, such coupling can provide for managing complexity via decomposition. For example, it can allow for more expressive inference rules optionally without changing PDDL semantics.

As an example, a system can integrate an answer set solver as an external solver that answers queries issued by a PDDL solver, in this case, POPEX. POPEX has already defined an interface that can interact with external solvers. An interface can facilitate computing physical effects of numeric processes. Requirements for integrating physics solvers with a planner tend to differ from the requirements for integrating logic solvers. For example, physics solvers can treat a completely different language and level of representation compared to those used by a planner. As an example, a planner can integrate with such a solver by requesting values of numeric variables in each state that is visited during a search; whereas, a logic solver can work on the same knowledge and problem-solving as the planner. Accordingly, in such an approach, the work of searching a space can be partitioned between a logic solver and a planner.

As an example, to integrate an answer set solver, a planning algorithm can be extended in two aspects such as via constructing a relaxed plan and via performing state progression.

Constructing Relaxed Plan

Generally, if a predicate occurs in the add list of an action, and it also occurs as an external predicate in ASP part, then the predicates can be relaxed into a logically stronger condition, meaning it can derive more effects than just the those encoded in PDDL.

For instance, the effect of action prepare_drilling_fluid may be relaxed to:

(at end (for all ?r (mudonspot ?m ?r)))

This relaxation is justified by the validity of logical implication:

forall ?r (mudonspot ?m ?r)->(mudonspot ?m r1)

State Progression

During state progression, the heuristics search can start by applying helpful actions it obtains from construction relaxed plan. In this case, for external atoms that occur in the precondition of an action, the planner can call the answer set solver to see if the atom is satisfied in the answer sets. For instance, the following action use mudonspot as a precondition:

```
(:durative-action send_mud
    :parameters (?r - run ?s - section ?m - mud)
    :duration (= ?duration sendmudtime)
    :condition (and (at start (currentsection ?s))
        (at start (insection ?s ?r))
        (at start (preparedFor ?r ?s))
        (at start (mudonspot ?m ?r)))
    :effect ((at end (mudsent ?m ?r))))
```

To progress the state by executing, for instance, (send_mud r2 s2 m2), the planner will query answer set solver for the condition (mudonspot r2 m2). The answer set solver will perform reasoning as detailed above and return true for the query. Therefore, it allows the planner to progress the state using action (send_mud r2 s2 m2). Similarly, if an external atom occurs in the effect of an action, its value during state progression can be assigned by querying answer set solver.

Further Extensions

A query answer set solver, during state progression, can allow a PDDL solver to handle a more complex logical expression by introducing an external atom. For instance, as it may be cumbersome to build a procedure of evaluating logical formulas into POPEX, to address the following action

```
(:durative-action tripout_bha_to_flowcheck_points
    :parameters (?m - flowcheckmarker ?r - run ?s - section)
    :duration (= ? duration (tripoutTime ?r))
    :condition (and
        (at start (needflowcheck ?m ?r))
        (forall (?m1 - flowcheckmarker) (implies (at start (needflowcheck ?m1 ?r)) (atstart (<= (markerdepth ?m1) (markerdepth ?m))))))
    :effect (and (at end (bhatrippedtoflowcheckmarker ?m ?r))
        (forall (?m1 - flowcheckmarker) (when (at end ((< (markerdepth ?m1) (markerdepth ?m)))) (at end (not (bhatrippedtoflowcheckmarker ?m1 ?r))))))
```

For the current POPEX to handle the two logical formulas in the above description, it can be cumbersome to build-in this process. As an example, alternatively, it can be rewritten as:

```
(:durative-action tripout_bha_to_flowcheck_points
    :parameters (?m - flowcheckmarker ?r - run ?s - section)
    :duration (= ? duration (tripoutTime ?r))
    :condition (and
        (at start (needflowcheck ?m ?r))
        (at start (closestmarker ?m ?r)))
    :effect (and (at end (bhatrippedtoflowcheckmarker ?m ?r)))
```

In such an example, a method can treat closestmarker and bhatrippedtoflowcheckmarker as external atoms. Then, such an approach can implement an ASP solver to decide if ?m is the current closet marker before executing this action, and negate the location of a BHA for other markers at the end of executing this action, as it can natural extend the capability of PDDL solver to handle complex preconditions and effects.

Figure 7:
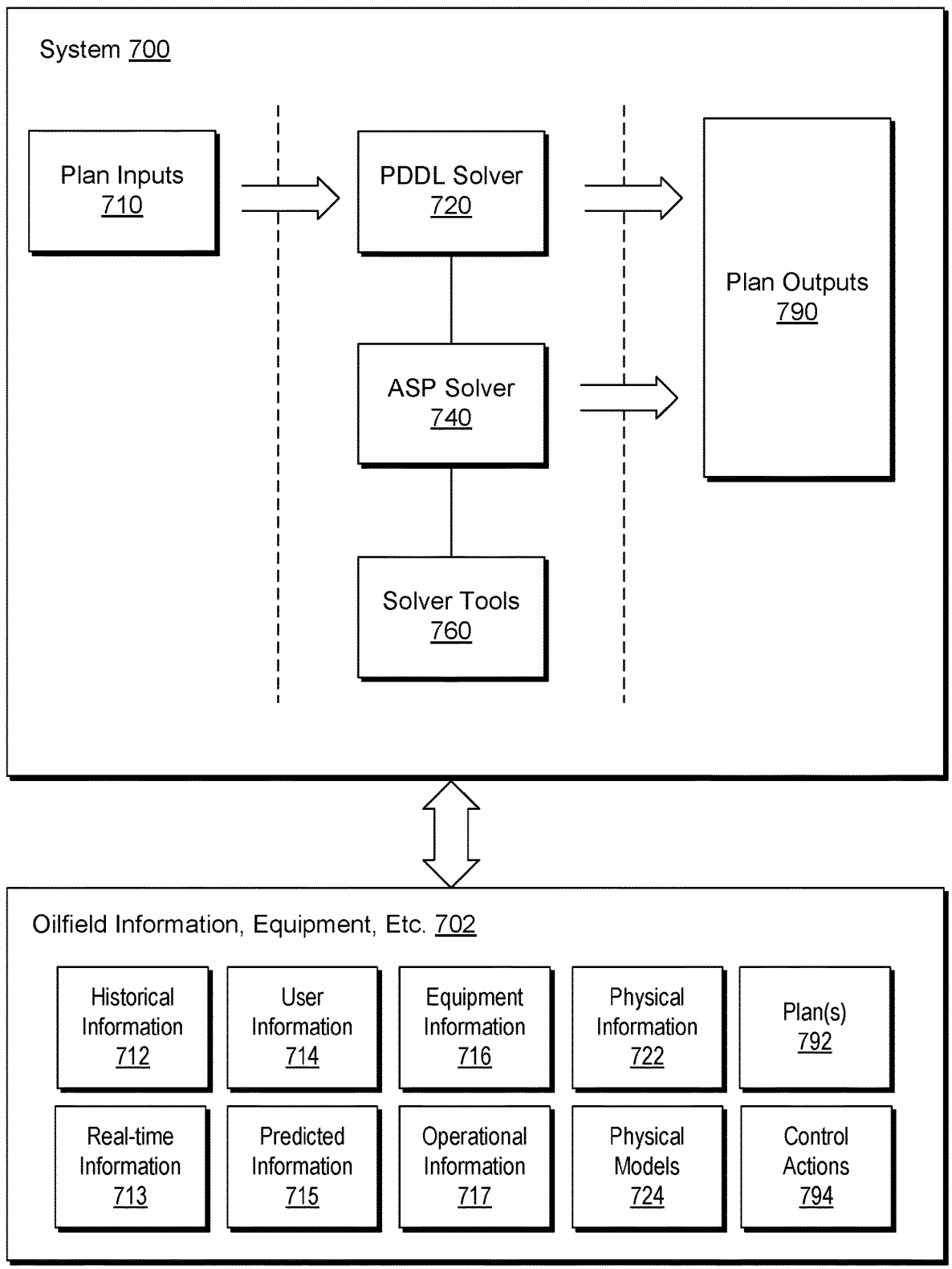
FIG. 7 illustrates an example of a system and various types of information that may be received and/or output by the system.

FIG. 7 shows an example of a system 700 that includes a plan inputs block 710, a PDDL solver block 720, an ASP solver block 740, a solver tools block 760 and a plan outputs block 790. In the system 700, the PDDL solver block 720 can issue queries that can be answered by the ASP solver block 740. As an example, the PDDL solver block 720 can include the POPEX solver, which includes a defined interface that can interact with one or more external solvers. As an example, the ASP solver block 740 may be integrated by extending a planning algorithm. For example, consider extending a planning algorithm via relaxed plan construction and via state progression. During state progression, the heuristics search can commence by applying one or more helpful actions it obtains from relaxed plan construction.

FIG. 7 also shows a block 702 that includes blocks for oilfield information, equipment, etc. For example, the block 702 can include a historical information block 712, a real-time information block 713, a user information block 714, a predicted information block 715, an equipment information block 716, an operational information block 7171, a physical information block 722, a physical models block 724, a plan or plans block 792 and a control actions block 794. As shown in the example of FIG. 7, the system 700 can receive and/or output information to the block 702, which can be operatively coupled to one or more physical data storage systems, one or more sensors, one or more pieces of equipment, one or more user input devices, etc. As an example, the plan inputs block 710 can receive information from the block 702 and, as an example, the plan outputs block 790 can transmit information to the block 702.

As an example, one or more portions of the system 700 and the block 702 can be operatively coupled to computational resources, which may be, for example, cloud-based resources. In such an example, one or more pieces of field equipment can be instrumented to received and/or transmit information to one or more cloud-based resources. As an example, the system 700 may reside "in the cloud" where one or more computers, monitors, smartphones, etc., can access the system 700. For example, a user at a computer at a rigsite may log into the system 700 to access a digital plan for oilfield operations to be performed at the rigsite. In such an example, the computer at the rigsite can include a display where the computer may render operational plan information as a GUI to the display (see, e.g., the GUI 600 of FIG. 6). As an example, the user may interact with such a GUI such that equipment at the rigsite performs one or more actions (see, e.g., various actions of the GUI 600 of FIG. 6, etc.). In such an example, the computer at the rigsite can be operatively coupled to circuitry of one or more pieces of equipment at the rigsite such that one or more signals (e.g., operational signals, commands, etc.) are issued for receipt by circuitry of one or more pieces of equipment at the rigsite.

As an example, where equipment at a rigsite is operational and executing one or more control actions specified by an oilfield operational plan, depending on one or more conditions, a call for re-planning of the oilfield operational plan may be made (see, e.g., the Maestro block 402 of the system 400 of FIG. 4). In such an example, the system 700 may be implemented for purposes of re-planning. As explained, the system 700 can partition tasks associated with plan generation such that, for example, a reduction in planner searching can be realized. In such an example, a reduction in planner searching, as achieved via partitioning (e.g., logic-based reasoning partitioning), can expedite re-planning. Where re-planning is expedited during execution of an oilfield operational plan at a rigsite (or rigsites), downtime may be reduced where such downtime may be classified as non-productive time (NPT). Accordingly, as an example, the system 700 can be implemented in a manner that can reduce NPT at one or more rigsites. As mentioned, the system 700 may be a remote system (e.g., cloud-based, etc.). As an example, the system 700 may be a local system, for example, implemented using computational resources at a rigsite. In the foregoing example, the user computer may optionally include the system 700 such that planning and/or re-planning may occur on site, locally at a rigsite. Referring to FIG. 2, the wellsite system 200 of FIG. 2 can be considered to be a rigsite. As shown in FIG. 2, the control and/or data acquisition system 262 can provide for interactions with one or more pieces of equipment, which can include, for example, surface equipment and/or downhole equipment (e.g., an associated circuitry, etc.).

As an example, the system 700 can be implemented such that the PDDL solver block 720 generates actions and the ASP solver block 740 can determine logical consequences of such actions. Such an approach can provide for decision making, for example, based on logical consequences of actions. As shown in FIG. 7, the system 700 can generate plan outputs from the PLLD solver block 720 and/or the ASP solver block 740. As mentioned, a plan output can be or include one or more control actions (see, e.g., control actions block 794).

In the example of FIG. 7, the system 700 includes two solvers where each of the solvers performs particular tasks, action generation and action assessment. The system 700 can be referred to as a hybrid solvers system. As an example, the PDDL solver block 720 can query the ASP solver block 740 as to tasks such as logical reasoning. For example, the ASP solver block 740 may assess a consequence or consequences of an action that is to be considered in a plan. Where the plan aims to achieve a goal, if the action is superfluous and/or otherwise without sufficient benefit, the action may be dropped and not included in the plan. As mentioned, the system 700 may be implemented for one or more re-planning purposes, for example, in response to one or more conditions that may exist at a rigsite during execution of an oilfield operational plan (e.g., as generated by the system 700 or another system).

As an example, a plan may aim to move a project (e.g., an oilfield project) from one state to another state over a period of time. To transition from one state to another, actions can be undertaken. A plan may aim to determine appropriate actions. A logic reasoning engine (e.g., a logic solver) may assess one or more proposed actions as to a desired state to be achieved (e.g., a goal or goals). A system may output a plan that includes actions where at least a portion of the actions have been assessed as to their consequences and/or utilities with respect to a desired state to be achieved (e.g., a goal or goals).

As an example, a system can be a planning system or a planner that can include a combinatorial planning engine that accesses a logical reasoning engine. In such an example, computing resources (e.g., cores, memory, etc.) may be available locally and/or remotely (e.g., via a network, the cloud, etc.). Such a system may be considered to be a hybrid engine planner or a hybrid solver planner. In such an example, the engines can include search capabilities where searches may be performed to generate one or more actions and/or one or more consequences of one or more actions.

Figure 8:
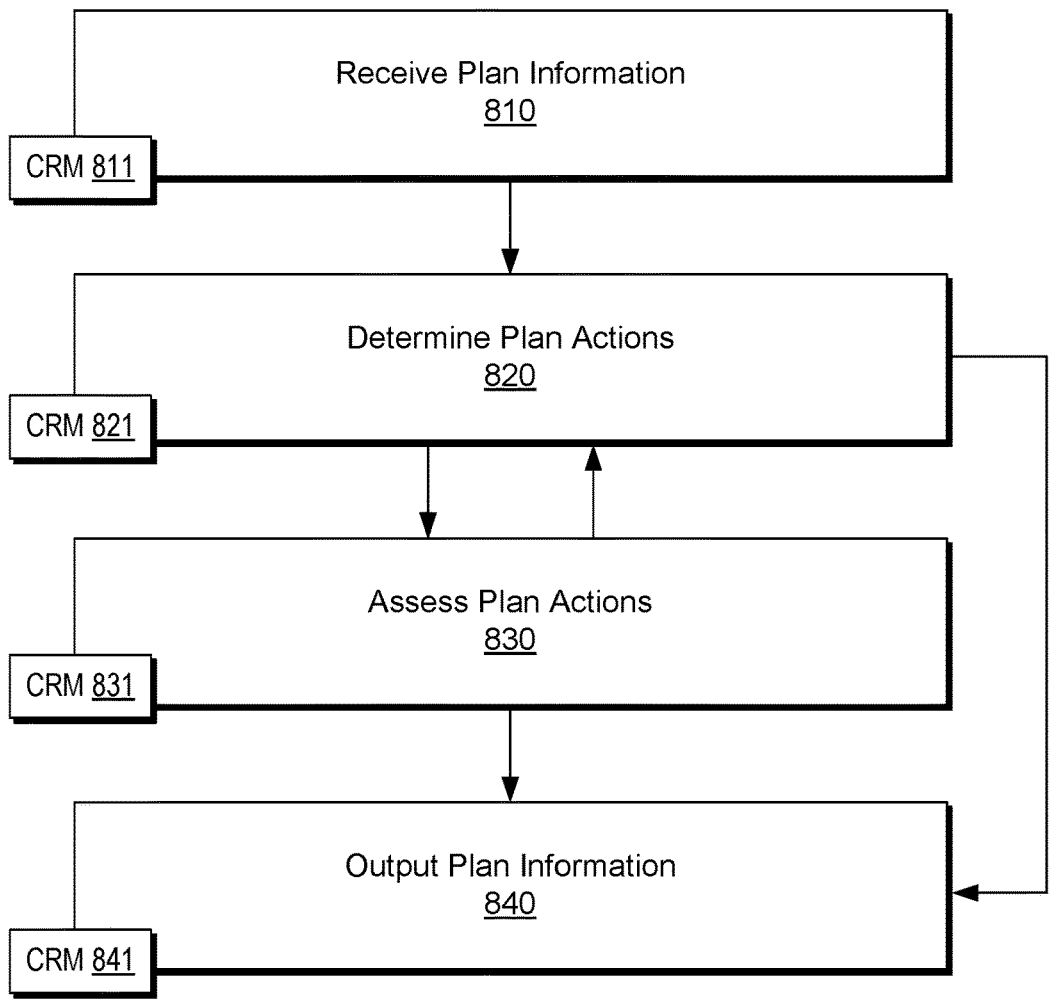
FIG. 8 illustrates an example of a method and an example of a system.
Figure 8:
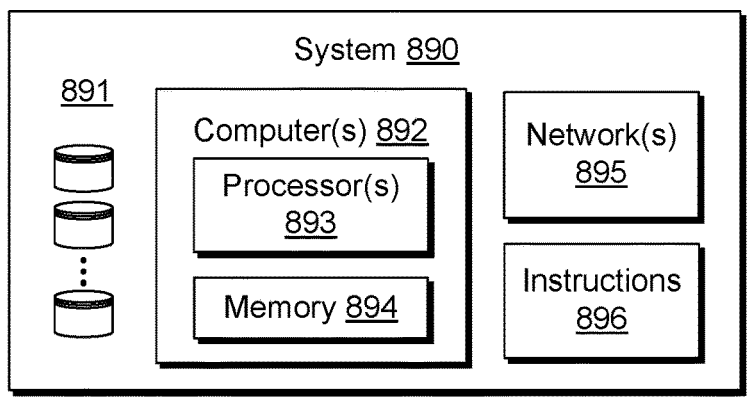

FIG. 8 shows an example of a method 800 that includes a reception block 810 for receiving plan information, a determination block 820 for determining plan actions, an assessment block 830 for assessing at least a portion of the plan actions and an output block 840 for outputting plan information based at least in part on the actions and assessment of the actions.

The method 800 can include, per the reception block 810, receiving oilfield operational plan information; per the determination block 820, determining oilfield operational plan actions based at least in part on the oilfield operational plan information by implementing a combinatorial solver; per the assessing block 830, assessing at least a portion of the oilfield operational plan actions by implementing a logical solver; and per the output block 840, based at least in part on the determining and the assessing, outputting an oilfield operational plan as a digital plan that specifies at least one control action for oilfield equipment.

FIG. 8 also shows various computer-readable media (CRM) blocks 811, 821, 831 and 841 as associated with the blocks 810, 820, 830 and 840. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format.

In the example of FIG. 8, a system 890 includes one or more information storage devices 891, one or more computers 892, one or more networks 895 and instructions 896. As to the one or more computers 892, each computer may include one or more processors (e.g., or processing cores) 893 and memory 894 for storing the instructions 896, for example, executable by at least one of the one or more processors (see, e.g., the block 811, 821, 831 and 841). As an example, a computer may include one or more network interfaces (e.g., wired or wireless), one or more graphics cards, a display interface (e.g., wired or wireless), etc.

As an example, a method can include receiving plan information; determining plan actions based at least in part on the plan information by implementing a combinatorial solver; assessing at least a portion of the plan actions by implementing a logical solver; and, based at least in part on the determining and the assessing, outputting a plan. In such an example, the combinatorial solver can be or include a PDDL solver. As an example, the logical solver can be or include an answer set problem (ASP) solver. As an example, a logical solver can generate logic output for a combinatorial solver, which may be a combinatorial search solver.

As an example, assessing can include determining a consequence of implementation of at least one plan action. For example, an ASP solver may receive one or more plan actions from a combinatorial solver and assess a consequence of implementation of the one or more plan actions. In such an example, a plan may be associated with a goal, which may progress a project from one state to another state. Where an action does not impact such progress, the action may be assessed as being superfluous with respect to the goal. In such an example, a plan may be generated that does not include superfluous actions. As an example, a plan can be or include a set of assessed plan actions.

As an example, a plan can be or include a field operations plan. As an example, a plan can be or include a well plan. As an example, a plan can include at least one assessed plan action that corresponds to a drilling operation.

As an example, a system can include a processor; memory accessible by the processor; processor-executable instructions stored in the memory and executable to instruct the system to: receive plan information; determine plan actions based at least in part on the plan information by implementing a combinatorial solver; assess at least a portion of the plan actions by implementing a logical solver; and, based at least in part on determined plan actions and assessed plan actions, output a plan.

As an example, one or more computer-readable storage media can include processor-executable instructions to instruct a computing system to: receive plan information; determine plan actions based at least in part on the plan information by implementing a combinatorial solver; assess at least a portion of the plan actions by implementing a logical solver; and, based at least in part on determined plan actions and assessed plan actions, output a plan.

As an example, a method can include receiving oilfield operational plan information; determining oilfield operational plan actions based at least in part on the oilfield operational plan information by implementing a combinatorial solver; assessing at least a portion of the oilfield operational plan actions by implementing a logical solver; and, based at least in part on the determining and the assessing, outputting an oilfield operational plan as a digital plan that specifies at least one control action for oilfield equipment. In such an example, the combinatorial solver can be or include Planning Domain Description Language (PDDL) solver and, for example, the logical solver can be or include an answer set problem solver. As an example, a method can include implementing a logical solver that generates logic output for a combinatorial solver.

As an example, a method can include assessing that includes determining a consequence of implementation of at least one oilfield operational plan actions. In such an example, a consequence can be utilized for deciding whether or not to include an action in a plan and/or for deciding a type of subsequent action to include in a plan. As an example, an oilfield operational plan can include a set of assessed oilfield operational plan actions.

As an example, an oilfield operational plan can be or include a well plan. As an example, an oilfield operational plan can include at least one assessed oilfield operational plan action that corresponds to a drilling operation.

As an example, a method can include receiving real-time oilfield operational plan information during implementation of an oilfield operational plan; determining oilfield operational plan actions based at least in part on the real-time oilfield operational plan information by implementing a combinatorial solver; assessing at least a portion of the oilfield operational plan actions by implementing a logical solver; and, based at least in part on the determining and the assessing, outputting a revised oilfield operational plan. In such an example, the real-time oilfield operational plan information can be or can include sensor information sensed by at least one sensor at a rigsite where the oilfield operational plan is being implemented. As an example, real-time oilfield plan information can be or can include drilling fluid information.

As an example, a method can include receiving digital plan by a computational framework where, for example, based at least in part on the digital plan and via the computational framework, the method can include rendering a graphical user interface to a display where the graphical user interface specifies the at least one control action for oilfield equipment. In such an example, the method may include controlling at least one piece of the oilfield equipment based at least in part on at least one of the at least one control action for oilfield equipment.

As an example, a system can include a processor; memory accessible by the processor; processor-executable instructions stored in the memory and executable to instruct the system to: receive oilfield operational plan information; determine oilfield operational plan actions based at least in part on the oilfield operational plan information by implementing a combinatorial solver; assess at least a portion of the oilfield operational plan actions by implementing a logical solver; and, based at least in part on determined oilfield operational plan actions and assessed oilfield operational plan actions, output an oilfield operational plan as a digital plan that specifies at least one control action for oilfield equipment. In such an example, the combinatorial solver can be or include a Planning Domain Description Language (PDDL) solver and the logical solver can be or include an answer set problem solver. In such an example, the logical solver can generate logic output for the combinatorial solver.

As an example, a system can include processor-executable instructions stored in the memory and executable to instruct the system to: receive real-time oilfield operational plan information during implementation of an oilfield operational plan; determine oilfield operational plan actions based at least in part on the real-time oilfield operational plan information by implementing a combinatorial solver; assess at least a portion of the oilfield operational plan actions by implementing a logical solver; and, based at least in part on determined oilfield operational plan actions and assessed oilfield operational plan actions, output a revised oilfield operational plan.

As an example, one or more computer-readable storage media can include processor-executable instructions to instruct a computing system to: receive oilfield operational plan information; determine oilfield operational plan actions based at least in part on the oilfield operational plan information by implementing a combinatorial solver; assess at least a portion of the oilfield operational plan actions by implementing a logical solver; and, based at least in part on determined oilfield operational plan actions and assessed oilfield operational plan actions, output an oilfield operational plan as a digital plan that specifies at least one control action for oilfield equipment. In such an example, the combinatorial solver can be or include a Planning Domain Description Language (PDDL) solver and the logical solver can be or include an answer set problem solver. In such an example, the logical solver can generate logic output for the combinatorial solver.

As an example, one or more computer-readable storage media can include processor-executable instructions to instruct a computing system to: receive real-time oilfield operational plan information during implementation of an oilfield operational plan; determine oilfield operational plan actions based at least in part on the real-time oilfield operational plan information by implementing a combinatorial solver; assess at least a portion of the oilfield operational plan actions by implementing a logical solver; and, based at least in part on determined oilfield operational plan actions and assessed oilfield operational plan actions, output a revised oilfield operational plan.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 9:
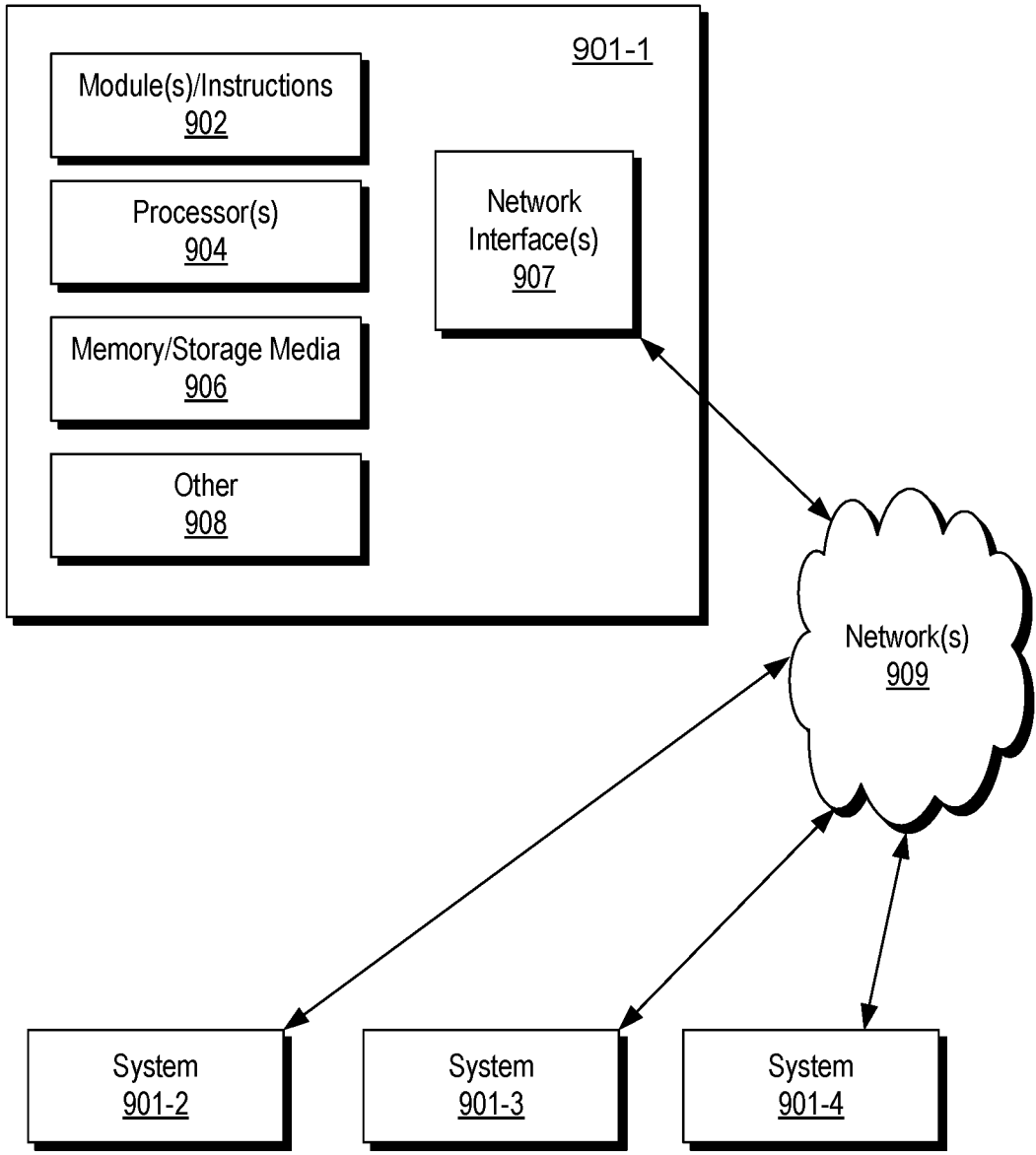
FIG. 9 illustrates an example of computing system.

In some embodiments, a method or methods may be executed by a computing system. FIG. 9 shows an example of a system 900 that can include one or more computing systems 901-1, 901-2, 901-3 and 901-4, which may be operatively coupled via one or more networks 909, which may include wired and/or wireless networks.

As an example, a system can include an individual computer system or an arrangement of distributed computer systems. In the example of FIG. 9, the computer system 901-1 can include one or more modules 902, which may be or include processor-executable instructions, for example, executable to perform various tasks (e.g., receiving information, requesting information, processing information, simulation, outputting information, etc.).

As an example, a module may be executed independently, or in coordination with, one or more processors 904, which is (or are) operatively coupled to one or more storage media 906 (e.g., via wire, wirelessly, etc.). As an example, one or more of the one or more processors 904 can be operatively coupled to at least one of one or more network interface 907. In such an example, the computer system 901-1 can transmit and/or receive information, for example, via the one or more networks 909 (e.g., consider one or more of the Internet, a private network, a cellular network, a satellite network, etc.).

As an example, the computer system 901-1 may receive from and/or transmit information to one or more other devices, which may be or include, for example, one or more of the computer systems 901-2, etc. A device may be located in a physical location that differs from that of the computer system 901-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 906 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 10:
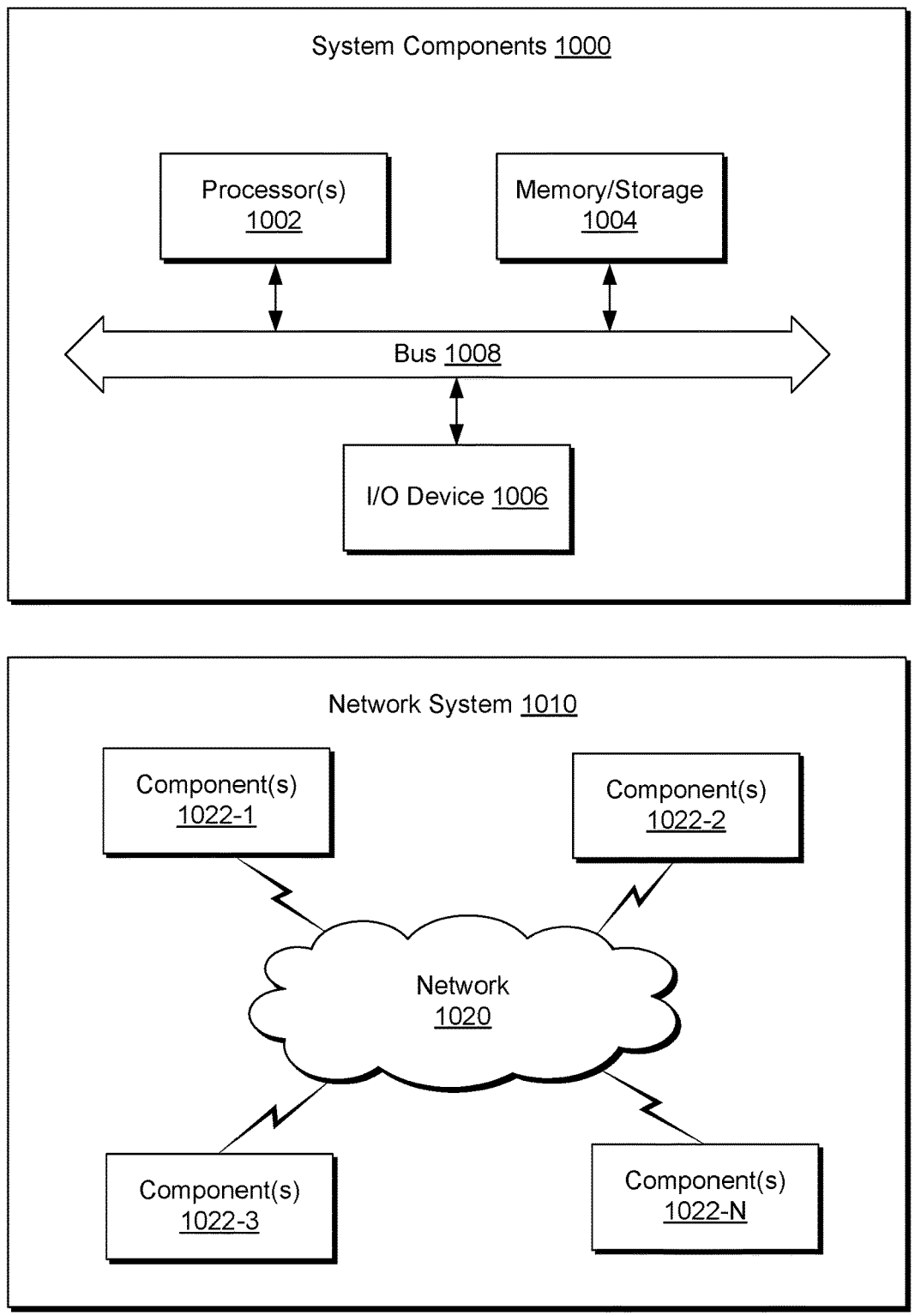
FIG. 10 illustrates example components of a system and a networked system.

FIG. 10 shows components of a computing system 1000 and a networked system 1010. The system 1000 includes one or more processors 1002, memory and/or storage components 1004, one or more input and/or output devices 1006 and a bus 1008. According to an embodiment, instructions may be stored in one or more computer-readable media (e.g., memory/storage components 1004). Such instructions may be read by one or more processors (e.g., the processor(s) 1002) via a communication bus (e.g., the bus 1008), which may be wired or wireless. The one or more processors may execute such instructions to implement (wholly or in part) one or more attributes (e.g., as part of a method). A user may view output from and interact with a process via an I/O device (e.g., the device 1006). According to an embodiment, a computer-readable medium may be a storage component such as a physical memory storage device, for example, a chip, a chip on a package, a memory card, etc.

According to an embodiment, components may be distributed, such as in the network system 1010. The network system 1010 includes components 1022-1, 1022-2, 1022-3, . . . 1022-N. For example, the components 1022-1 may include the processor(s) 1002 while the component(s) 1022-3 may include memory accessible by the processor(s) 1002. Further, the component(s) 1022-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
   receiving oilfield operational plan information;
   determining oilfield operational plan actions based at least in part on the oilfield operational plan information by implementing a combinatorial solver to search a state space;
   partitioning the search of the state space by implementing a logical solver that receives from the combinatorial solver contextual information as to an operational state and a query for a corresponding one of the oilfield operational plan actions, wherein, in response, the logical solver determines and returns an answer to the query to the combinatorial solver and wherein the logical solver comprises inference rules for context dependent application of the answer to one or more other oilfield operational plan actions for at least one subsequent operational state as a side effect of performance of the one of the oilfield operational plan actions;
   based at least in part on the determining and the partitioning, outputting an oilfield operational plan as a digital plan that specifies at least one control action for oilfield equipment; and
   responsive to performance of at least one of the at least one control action, calling for re-planning of the digital plan via implementation of the combinatorial solver and the logical solver, wherein implementation of the logical solver expedites re-planning.

2. The method of claim 1 wherein the combinatorial solver comprises a Planning Domain Description Language (PDDL) solver.

3. The method of claim 1 wherein the logical solver comprises an answer set problem solver.

4. The method of claim 1 wherein the implementing the logic solver comprises determining a consequence of implementation of at least one of the oilfield operational plan actions.

5. The method of claim 1 wherein the oilfield operational plan comprises a well plan.

6. The method of claim 1 wherein the oilfield operational plan comprises at least one oilfield operational plan action that corresponds to a drilling operation.

7. The method of claim 1 comprising:
responsive to the performance of the at least one of the at least one control action, receiving real-time oilfield operational plan information during implementation of the oilfield operational plan; and
performing the re-planning to output a revised oilfield operational plan.

8. The method of claim 7 wherein the real-time oilfield operational plan information comprises sensor information sensed by at least one sensor at a rigsite where the oilfield operational plan is being implemented.

9. The method of claim 7 wherein the real-time oilfield operational plan information comprises drilling fluid information.

10. The method of claim 1 comprising receiving the digital plan by a computational framework.

11. The method of claim 10 comprising, based at least in part on the digital plan and via the computational framework, rendering a graphical user interface to a display wherein the graphical user interface specifies the at least one control action for oilfield equipment.

12. The method of claim 11 comprising controlling at least one piece of the oilfield equipment based at least in part on at least one of the at least one control action for oilfield equipment.

13. A system comprising:
a processor;
memory accessible by the processor;
processor-executable instructions stored in the memory and executable to instruct the system to:
receive oilfield operational plan information;
determine oilfield operational plan actions based at least in part on the oilfield operational plan information by implementing a combinatorial solver to search a state space;
partition the search of the state space by implementing a logical solver that receives from the combinatorial solver contextual information as to an operational state and a query for a corresponding one of the oilfield operational plan actions, wherein, in response, the logical solver determines and returns an answer to the query to the combinatorial solver and wherein the logical solver comprises inference rules for context dependent application of the answer to one or more other oilfield operational plan actions for at least one subsequent operational state as a side effect of performance of the one of the oilfield operational plan actions;
based at least in part on the determined oilfield operational plan actions and the partitioned search of the state space, output an oilfield operational plan as a digital plan that specifies at least one control action for oilfield equipment; and
responsive to performance of at least one of the at least one control action, call for re-planning of the digital plan via implementation of the combinatorial solver and the logical solver, wherein implementation of the logical solver expedites re-planning.

14. The system of claim 13 wherein the combinatorial solver comprises a Planning Domain Description Language (PDDL) solver and wherein the logical solver comprises an answer set problem solver.

15. The system of claim 13 comprising processor-executable instructions stored in the memory and executable to instruct the system to:
responsive to the performance of the at least one of the at least one control action, receive real-time oilfield operational plan information during implementation of the oilfield operational plan; and
perform the re-planning to output a revised oilfield operational plan.

16. One or more non-transitory computer-readable storage media comprising processor-executable instructions to instruct a computing system to:
receive oilfield operational plan information;
determine oilfield operational plan actions based at least in part on the oilfield operational plan information by implementing a combinatorial solver to search a state space;
partition the search of the state space by implementing a logical solver that receives from the combinatorial solver contextual information as to an operational state and a query for a corresponding one of the oilfield operational plan actions, wherein, in response, the logical solver determines and returns an answer to the query to the combinatorial solver and wherein the logical solver comprises inference rules for context dependent application of the answer to one or more other oilfield operational plan actions for at least one subsequent operational state as a side effect of performance of the one of the oilfield operational plan actions;
based at least in part on the determined oilfield operational plan actions and the partitioned search of the state space, output an oilfield operational plan as a digital plan that specifies at least one control action for oilfield equipment; and
responsive to performance of at least one of the at least one control action, call for re-planning of the digital plan via implementation of the combinatorial solver and the logical solver, wherein implementation of the logical solver expedites re-planning.

17. The one or more non-transitory computer-readable storage media of claim 16 wherein the combinatorial solver comprises a Planning Domain Description Language (PDDL) solver and wherein the logical solver comprises an answer set problem solver.

18. The one or more non-transitory computer-readable storage media of claim 16 comprising processor-executable instructions to instruct a computing system to:
responsive to the performance of the at least one of the at least one control action, receive real-time oilfield operational plan information during implementation of the oilfield operational plan; and
perform the re-planning to output a revised oilfield operational plan.

* * * * *